United States Patent [19]
Mueller

[11] 3,827,520
[45] Aug. 6, 1974

[54] CLUTCH MEANS FOR A 4 × 4 DRIVE TRANSFER VEHICLE

[75] Inventor: James F. Mueller, Lakewood, Ohio

[73] Assignee: Eaton Corporation, Cleveland, Ohio

[22] Filed: June 25, 1973

[21] Appl. No.: 373,238

[52] U.S. Cl.............................. 180/44 R, 192/48.92
[51] Int. Cl.......................................... B60k 17/02
[58] Field of Search.............. 180/44 R, 24.09, 24.1; 192/48.92, 49

[56] References Cited
UNITED STATES PATENTS
2,928,485   3/1960   Christie............................ 180/24.1
3,295,625   1/1967   Ordorica et al.................. 180/44 R Primary Examiner—Trygve M. Blix
Assistant Examiner—Jesus D. Sotelo
Attorney, Agent, or Firm—Teagno & Toddy

[57] ABSTRACT

A truck-tractor drive arrangement of the type which automatically converts rear wheel drive into four wheel drive includes a housing attached to the input end of a standard front drive-steer axle. Within the housing is a unidirectional clutch for driving the front wheels in a forward direction whenever the rear wheels lose traction and slip. An automatic lockout of the unidirectional clutch is provided for locking the arrangement into four wheel drive when drive occurs in a rearward direction. Alternatively, the lockout may also include provisions for automatically disengaging the unidirectional clutch when the tractor is travelling at highway speeds in the forward direction.

9 Claims, 5 Drawing Figures

CLUTCH MEANS FOR A 4 × 4 DRIVE TRANSFER VEHICLE

This invention relates generally to a truck-tractor drive arrangement and more particularly to drive arrangements which shift automatically from rear wheel to four wheel drive under predetermined conditions.

Drive-train arrangements of the type to which this invention relates typically employ a unidirectional clutch which normally overruns for rear wheel drive (a 4 × 2 drive train) but automatically engages to produce four wheel drive (a 4 × 4 drive train) when the rear wheels rotate faster than the front wheels in a forward direction. Such drive arrangements have proven especially suited for pulling "double" and "triple" trailer combinations which result in particular tractor loadings requiring, at times, tractive effort from both front and rear axles. For obvious reasons, it is not desirable to run such tractors in locked, four wheel drive at highway speeds.

While such arrangements have generally functioned in accordance with their intended purpose, deficiencies still remain in the drive arrangements. For example, the overrunning clutch will not supply tractive effort to the front wheels when the tractor is driven in reverse. Also, because the clutch drivingly engages the front drive-steer axle when the rear wheels rotate faster than the front, it is possible for the clutch to be instantaneously engaged during normal highway operation. This may place undesirable stress on front axle components causing undue wear, etc. Furthermore when a multispeed rear axle is used in such arrangements and the axle is shifted to one of its higher speeds, excessive overrunning of the unidirectional clutch occurs and the clutch becomes worn in a relatively short time. Finally, unidirectional overrunning clutches have heretofore been employed in transfer cases mounted either to the transmission or rear axle housing; both types of arrangements requiring the use of especially-made parts and in some instances limiting the tractor-wheel base to a smaller dimension than what otherwise might be possible.

It is thus a principal object of the subject invention to provide in a tractor-drive arrangement employing a unidirectional, overrunning clutch therein, simple and efficient clutch lockout means which automatically places the arrangement in four wheel drive when the tractor is shifted into reverse.

In accordance with the invention, this object, along with other features of the invention, is achieved by providing a tractor-drive arrangement which includes a transmission, a rear drive axle, and a front drive-steer axle. The rear axle has a first drive pinion connected to a rear drive shaft from the transmission for driving the rear wheels. The first drive pinion also drives an output shaft, in turn connected to a front drive shaft, at a speed slightly less than that of the rear drive shaft.

Bolted to the bearing cage of the front axle is a unidirectional clutch housing. Extending within the clutch housing is an input shaft for driving the front axle and a second drive pinion connected to the front drive shaft and adapted to drive the input shaft either by a unidirectional clutch or by clutch lockout means. The unidirectional clutch includes a plurality of especially-configured, saw-tooth type teeth disposed annularly about juxtaposed end faces of the second drive pinion and a spring-biased, annular clutch member splined to and slidably mounted on the input shaft.

The lockout means includes a like plurality of straight teeth spaced about the peripheries of the clutch member and the second drive pinion. An internally-toothed, annular collar member is received in toothed engagement with the clutch member and movable by a bifurcated shift lever into toothed engagement with the second drive pinion so that the input shaft and pinion shaft are locked for common rotation. The shift lever is connected with a power member which, in turn, is actuated by movement of the low-reverse shift rail within the transmission.

In accordance with another feature of the invention, the power member is of the type which may be actuated in both a forward and rearward direction. A stop is provided on the clutch member remote from that member's toothed end face and a two-speed rear driving axle is employed in the drive arrangement. When the shift mechanism in the rear axle is actuated to place same in its second gear, the power member is simultaneously actuated to displace the unidirectional clutch against its spring bias thus rendering the clutch inoperative.

Yet another feature of the subject invention resides in the overrunning clutch housing design. The cast housing, in addition to being easily mounted onto the bearing cage of a standard front drive-steer axle, also includes a configured bore extending therein, the wall surfaces of which define a housing for a power member of the air cylinder type. The cylinder is defined by placing a sealed piston within the bore, a spring(s) biasing the piston into a normally unactuated position and a cover plate at the end of the housing sealing the bore after inserting the spring and piston therein.

It is thus another object of the subject invention to provide in a tractor-drive arrangement utilizing a unidirectional overrunning clutch for converting the arrangement to four wheel drive, clutch lockout means which not only locks the drive arrangement into a four wheel drive when the tractor is placed in reverse but which also automatically disengages the unidirectional clutch when the tractor is travelling at relatively high speeds in the forward direction.

Yet another object of the subject invention is to provide an improved tractor-drive arrangement by means of a housing carrying a unidirectional, overrunning clutch arrangement therein, which housing in addition to being easily mounted onto a standard front drive-steer axle also contains a power member as an integral part thereof for locking the clutch arrangement.

The invention may take physical form in certain parts and arrangement of parts, a preferred embodiment of which will be described in detail herein and illustrated in the accompanying drawings which form a part hereof and wherein.

Figure 1:
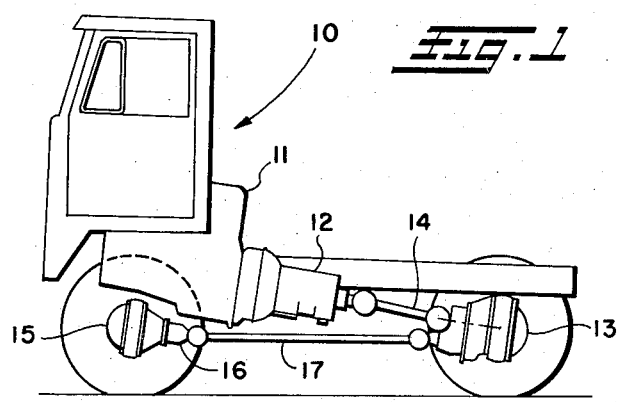
FIG. 1 is an outline drawing of a truck-tractor employing the drive arrangement of the subject invention.

Referring now to the drawings wherein the showings are for the purpose of illustrating a preferred embodiment of the invention only and not for the purpose of limiting same, FIG. 1 shows a truck-tractor 10 of the cab-over type having an engine 11, a transmission 12, a rear axle 13, a rear drive shaft 14 connecting the transmission to the rear axle and a front drive-steer axle 15. Secured to the input end of the front drive-steer axle 15 is a unidirectional clutch housing 16, and a front drive shaft 17, extending from the rear axle 13, is provided for driving the front axle 15 through clutch housing 16.

The transmission 12, rear axle 13 and front drive-steer axle 15 as shown in FIG. 1 are known in the art and thus need not be shown or described further in detail herein. However, reference may be had to copending applications entitled "Drop Center Drive-Steer Axle," Ser. No. 293,204, filed Sept. 28, 1972 by J. Wolansky which discloses a front drive-steer axle that may be employed herein in place of the standard front drive-steer axle 15 and "Four Wheel Drive Vehicle With Drive Transfer Gear Assembly," Ser. No. 296,360, filed Oct. 5, 1972 by R. C. Romick which, insofar as the structure shown therein relates to a truck proportioning rear axle, may be employed for the rear axle 13.

Figure 2:
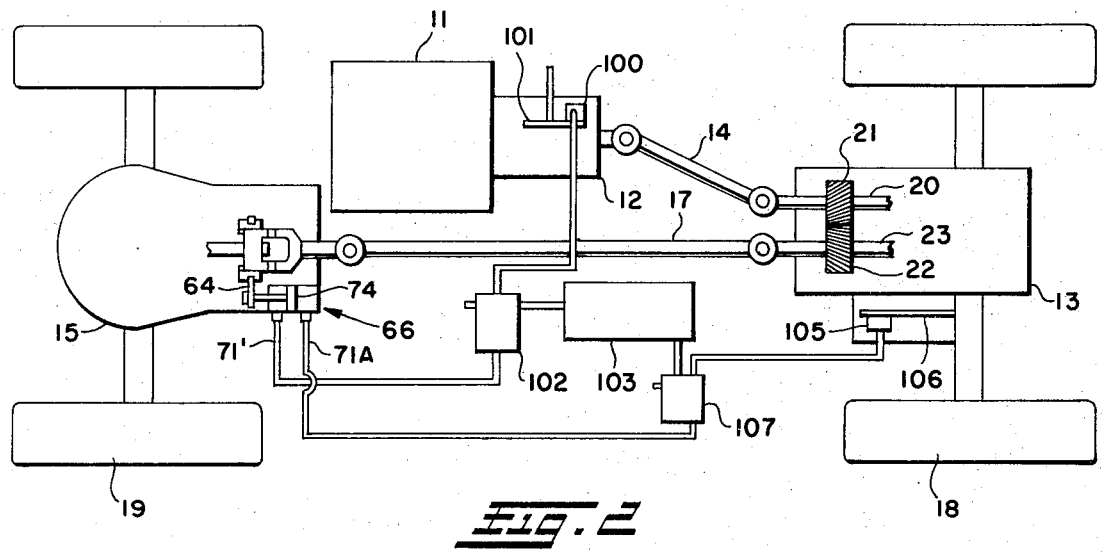
FIG. 2 is a schematic illustration of the drive-train arrangement of the subject invention.

Referring now to FIG. 2, it is apparent that drive from transmission 12 is transferred to rear axle 13 by rear drive shaft 14 secured to a first drive pinion 20 which, in turn, drives the rear wheels 18 in a conventional manner. A first helical gear 21 on the first drive pinion 20 drives a second helical gear 22 on an output shaft 23 extending from the rear axle housing and the output shaft 23 is connected to front drive shaft 17. In the preferred embodiment, it is contemplated that first helical gear 21 has 31 teeth spaced thereabout while second helical gear 22 has 32 teeth spaced thereabout; the front drive shaft 17 thus rotating approximately 3.3 percent slower than the rear drive shaft 14. This ratio has been established to assure slower rotation of the front drive shaft even though tire sizes, tire wear, inflation, etc., for tires on one axle may differ from those on the other axle. If it is desired that rotation of the front drive shaft 17 be in the same direction as that of the rear drive shaft 14, then a helical idler gear (not shown) may be employed inbetween the first and second gears 21, 22.

Figure 3:
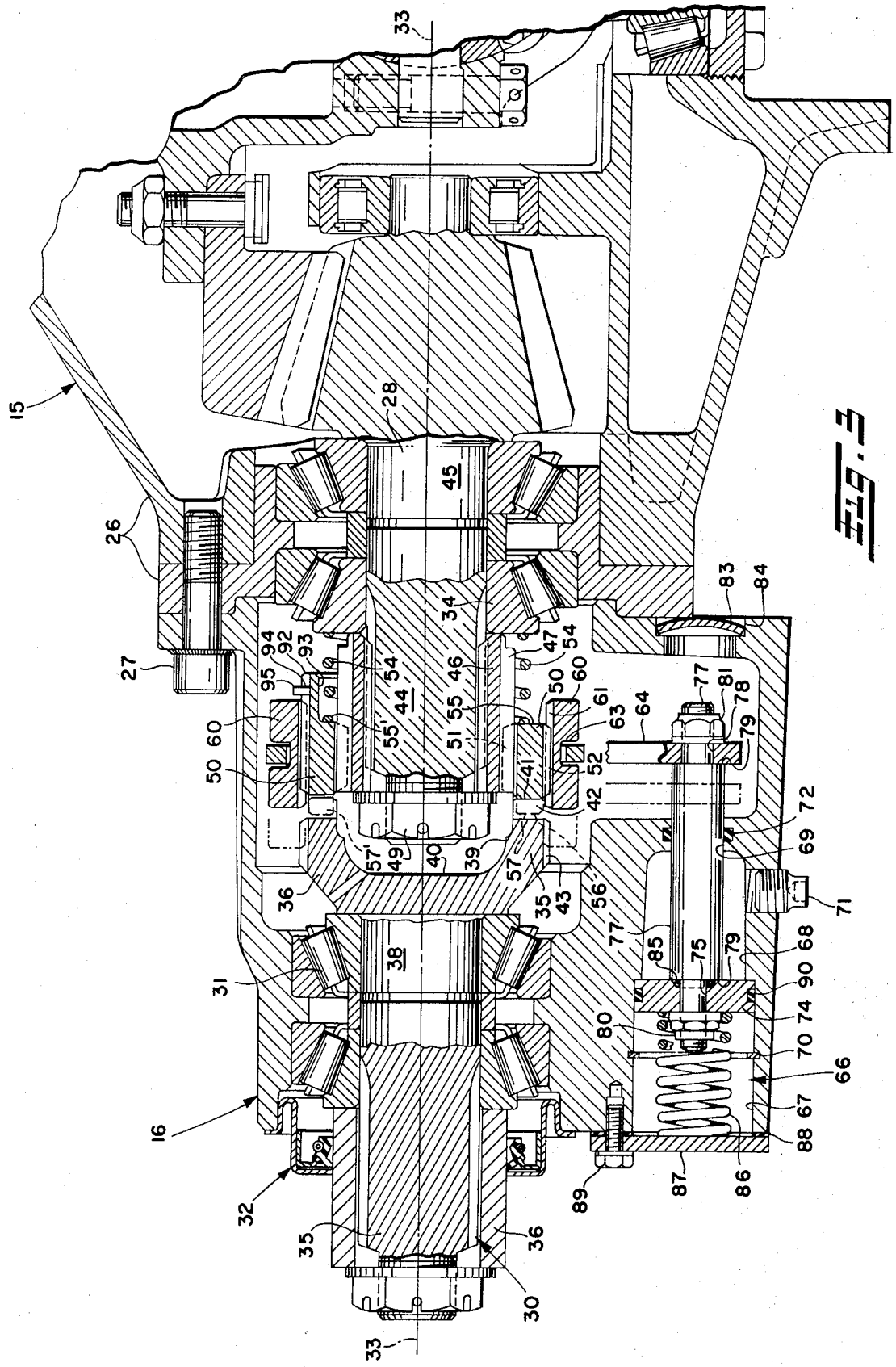
FIG. 3 is a longitudinally-sectioned view of the unidirectional clutch housing illustrating the component parts employed in both the preferred and alternative embodiments of the invention.

Referring now to FIG. 3, there is shown the unidirectional clutch housing 16 secured to a standard front drive-steer axle 15; the housing 16 being sectioned to show the component parts therein. More particularly housing 16 is shown attached to the standard bearing cage 26 of the front drive-steer axle by means of a plurality of bolts 27 in threaded engagement therewith. It should be noted that the only modification required to a standard front drive axle 15 to receive the unidirectional clutch housing 16 of the present invention is to remove the retainer seal assembly and the yoke from the front axle drive pinion hereafter referred to as an input shaft 28.

The component parts of the unidirectional clutch housing shown in FIG. 3 include a second drive pinion 30 journalled within the housing by a tapered roller bearing arrangement 31 and sealed by a retainer seal assembly 32. Longitudinally-aligned with second drive pinion along centerline 33 is the input shaft 28 which is likewise journalled by a tapered roller bearing arrangement 34 in the front axle.

Second drive pinion 30 has a first portion 35 outside the clutch housing and a second portion 38 within clutch housing 16. First pinion portion 35 is provided with a conventional yoke 36 splined thereto for connecting same with front drive shaft 17. Second pinion portion 38 within the clutch housing has an end portion 39 which is centrally recessed as at 40 to define an annular end face surface 41 about which a plurality of saw-tooth type teeth 42 are formed. Adjacent end portion 39 and disposed peripherally about the second pinion portion 38 are a plurality of straight teeth 43.

Input shaft 28 likewise has a first portion 44 within the clutch housing 16 and a second portion 45 within the front drive-steer axle 15. First input shaft portion 44 is splined and an annular spacer 46 similarly splined about its interior and having a plurality of straight teeth 47 about its outer periphery is received over input shaft portion 44 in splined relation therewith. Spacer 46 is thus fixed for common rotation with input shaft 28 and is prevented from axial displacement relative thereto by a nut 49 in threaded engagement with the end of shaft 28 to hold spacer 46 in solid contact against the inner race of the input shaft's tapered bearing arrangement 34. Received in splined sliding engagement with external straight teeth 47 of spacer 46 is an annular, sliding clutch member 50.

In FIG. 3 clutch member 50 of the preferred embodiment is shown below longitudinal centerline 33 whereas a clutch member 50' of an alternative embodiment is shown above centerline 33 and like numbers designated by a prime (') will indicate like parts where applicable. Clutch member 50 has a plurality of straight teeth 51 and 52 spaced about its interior and exterior surfaces, respectively. The interior teeth 51 engage teeth 47 of spacer 46 and fix clutch member 50 to spacer 46 for common rotation with the input shaft 28 and a compression spring 54 between an end face 55 of clutch 50 and the inner race of tapered bearing arrangement 34 is provided to bias clutch member 50 to the left as shown in FIG. 3. A plurality of saw-tooth type teeth 57 are formed about the opposite end face 56 of clutch member 50.

Figure 4:
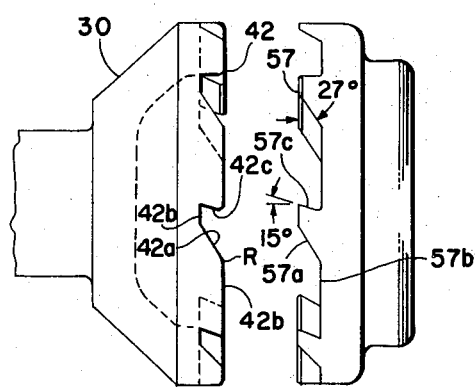
FIG. 4 is a detailed showing of the unidirectional clutch.

The interaction between saw-tooth type teeth 57 of the clutch member 50 and the saw-tooth type teeth 42 of the second drive pinion 30 define the unidirectional clutch means of the subject invention. The configuration of the teeth are shown in FIG. 4; the number of teeth (8) and the tooth configuration for both the second drive pinion and clutch member 30, 50 being substantially identical to one another. The tooth configuration thus shown for the pinion and clutch member saw-tooth type teeth 42, 57 comprises respectively a ramp-angled, rise face 42a, 57a contiguous with a dwell face 42b, 57b (which exists at both the crest and valley of each tooth) which in turn is contiguous with an undercut, engaging face 42c, 57c. As shown in FIG. 4 the rise face surface 42a, 57a is formed at an angle of 27° to the crest dwell face 42b, 57b and the engaging face surface 42c, 57c is undercut at an angle of 15° relative to the crest dwell face surface 42b, 57b. All teeth surface intersections are formed with relatively small radii except that the intersection of the dwell face surface 42, 57b with the rise face surface 42a, 57a is provided with a generous radius indicated at R in FIG. 4 (approximately ½ inch in the preferred embodiment) which promotes a good tooth wear pattern.

The tooth configuration thus described is formed from alloyed steel forgings case carborized to a hardness of approximately $R_c60$ and has exhibited excellent wear characteristics. Service tests conducted with a one-speed rear axle and a biasing spring force of approximately 10 pounds in the clutch engaged position and 15 pounds in the disengaged position failed to show objectionable tooth wear patterns after 300,000 field miles.

Lockout means are provided to effect direct drive engagement between the second drive pinion 30 and the input shaft 28 upon happening of predetermined conditions when the clutch teeth 42, 57 are not in driving relationship. The lockout means includes an annular collar member 60 having a plurality of interiorly-disposed, straight teeth 61 which are splined to teeth 52 to fix the collar to clutch member 50 for common rotation therewith while permitting axial displacement of the collar relative to the clutch member. The axial displacement of the collar relative to the clutch member 50 is controlled by a circumferential groove 63 formed in the exterior surface of the collar which receives a bifurcated shift lever 64 which extends at least to the midpoint of the collar. Controlling the movement of shift lever 64 is a power member 66 which is shown as an air cylinder although the power member could alternatively comprise known mechanical force transmitting means, a vacuum motor, a linear electrically-operated actuator, etc.

The air cylinder 66 shown in FIG. 3 comprises first, second, and third concentric, consecutively stepped bores 67, 68, 69, respectively. Within the first bore 67 is a snap ring 70 which serves as a travel stop. Communicating with the second bore 68 is an air fitting 71 and within the third bore 69 is an O-ring seal 72. Disposed within the first bore 67 is a circular piston 74 which has a centrally-located opening 75 extending therethrough. Within opening 75 is a threaded member 77 which extends through the shift lever 64 through an opening 78 in the bottom of shift lever 64; opening 78 and that portion of member 77 received within the opening being formed in the shape of a "D" to prevent relative rotation. Nuts 80, 81 threaded onto opposite ends of threaded member 77 compress shift lever 64 and piston 74 against shoulders 79 formed onto the threaded member and thus fix shift lever 64 for common movement with piston 74. It should be noted that a knockout plug 83 is provided in a rearward recess 84 of the clutch housing 16 and recess 84 in conjunction with the opening at the opposite housing end defined by the first bore 67 provide access openings for tightening nuts 80, 81 during assembly. It should also be noted that an O-ring seal 90 about piston 74 seals the piston within the first bore 67 and that a third O-ring seal 85 between tube-type spacer 78 and threaded member 77 prevents leakage through the piston's central opening 75. The piston 74 is maintained in its neutral, unactuated position as shown by means of a coil compression spring 86 which seats against the piston at one end and a cover plate 87 at its other end. Cover plate 87 along with its gasket 88 is secured to the front of housing 16 by means of threaded fasteners 89. When cylinder 66 is actuated, air under pressure is provided through the fitting 71 into the second bore 68 causing piston 74 to retract against the bias of spring 86 until reaching solid snap ring stop 70. In this position, the shift lever 64 has correspondingly been retracted a like distance and the collar 60 has moved into toothed engagement with the straight pinion teeth 43 to provide a direct drive engagement from the second drive pinion 30 through the collar 60 to the spacer 46 and from thence to the input shaft 28.

Figure 5:
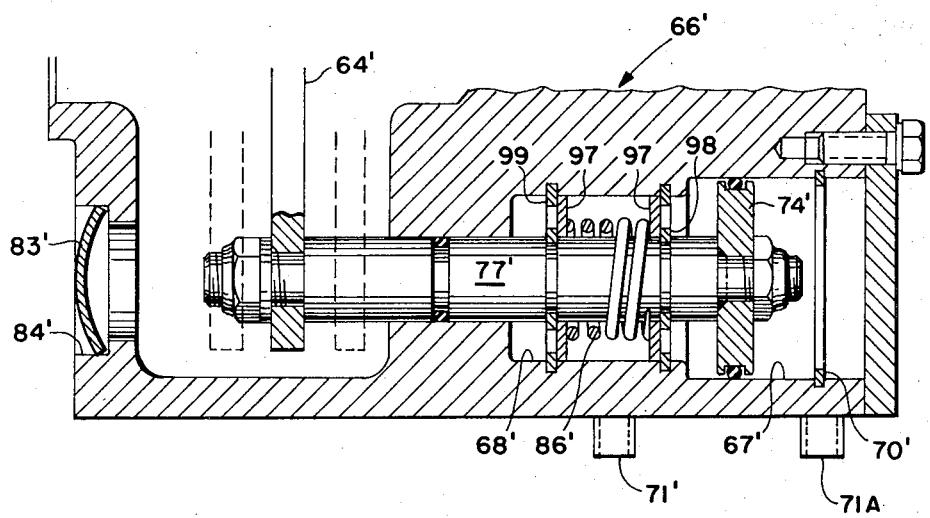
FIG. 5 is a detailed showing of an alternative embodiment of the air cylinder shown in FIG. 3.

As noted above, an alternative clutch member 50' is shown in FIG. 3 above centerline 33. Clutch member 50' is adapted not only to lockingly engage the second drive pinion 30 with the input shaft 28 but also to disengage clutch member 50' from second drive pinion 30. To accomplish disengagement, the rear portion of clutch member 50' has been extended as a tubular-type end portion 92, the interior of which 93 serves as a peripheral cage for spring 54. Adjacent the end face 55' of clutch member 50' is an annular groove 94 formed in the outer periphery of the tubular portion 92. Within annular groove 94 is a snap-type ring 95 which functions as a stop for collar member 60. When collar member 60 is moved towards the right, as viewed in FIG. 3, the unidirectional clutch is disengaged. To provide for forward and rearward travel of the shift lever 64, the air cylinder 66 would have to be modified into a two-port arrangement as shown in FIG. 5 wherein like numbers designated by a prime (') indicate like parts where applicable. The air cylinder 66' shown uses a single spring 86' to positively maintain piston 74' centered in an unactuated position. The spring arrangement includes a pair of washers 97 received over threaded rod 77' at the axial ends of spring 86'. Each washer also abuts a first snap ring 98 positioned in a groove on the rod which is normally aligned with a second snap ring 99 positioned in a groove formed in concentric bore 68'. Actuation of air cylinder 66' in either forward or rearward direction by supplying compressed air to either of fittings 71' or 71—A causes spring 86' to be compressed against one washer 97 and one second ring 99 at one spring end by movement of one first snap ring 98 and washer 97 at the other spring end. Venting occurs through the fitting in the unactuated chamber.

OPERATION

With reference now to FIG. 2 the operation of the subject invention is as follows. When a tractor is travelling at highway speeds in a forward direction, drive is transmitted from engine 11, through transmission 12 to the first pinion 20 in rear axle 13 which drives the rear wheels 18 in conventional manner. The first drive pinion 20 in the rear axle also drives through gears 21, 22 output shaft 23 which, in turn, is connected to the front drive shaft 17; the rotation of the front drive shaft being 3.3 percent slower than the rotation of the rear drive shaft because of the different number of gear teeth as noted above. Because the front and rear axle ratios are the same in such drive arrangements, the input shaft 28 for the front drive-steer axle 15 which is rotated by the front wheels 19 turns 3.3 percent faster than that of the second drive pinion 30. This causes the saw-tooth type teeth 57 on the input shaft 28 to overrun the saw-tooth type teeth 42 on the second drive pinion 30 because clutch member 50 is rotating in a clockwise direction faster than that of the second drive pinion 30 when viewing the members endwise from the left-hand side of FIGS. 3, 4 (which rotational direction represents a forward movement of the truck-tractor 10). When the clockwise rotation of the second drive pinion 30 is greater than the clockwise rotation of the clutch member 50 which occurs when the rear wheels of the tractor slip in a forward direction, the undercut engaging face surfaces 42c, 57c of the unidirectional clutch teeth will lock with one another to effect driving engagement with the front drive-steer axle 15.

When the tractor 10 is placed in reverse, resulting in counterclockwise rotation of the front drive shaft 17, drive through the unidirectional clutch cannot occur as the rise face surface 42a of the second drive pinion 30 tends to move past the rise face surface 57a of the clutch member 50. While it is true that the clutch member 50 will tend to rotate in a counterclockwise direction faster than that of the second drive pinion 30 because of the gear ratio between gears 21, 22, this will only result in saw-tooth type teeth 42, 57 maintaining a fixed relationship with one another as it is clear that drive or power to the front axle 15 must occur through the second drive pinion 30 and not vice versa.

In this condition the lockout means as described above is actuated to provide a direct drive connection between the second drive pinion 30 and the input shaft 28 as it is desirable for lockout to occur automatically. That is the straight teeth 43 formed in the second drive pinion 30 and the interiorly-disposed straight teeth 61 on the connecting collar member 60 are chamfered in a known manner to assure positive engagement in any relative position of the members. If the lockout was actuable by the truck operator, a synchronizer ring and blockers would have to be positioned between the second drive pinion and clutch member because of the possibility that lockout would occur while the members 28, 30 were rotating.

Thus an automatic arrangement for actuating lockout with the clutch members at rest is shown schematically in FIG. 2. The arrangement comprises a switch such as a detent 100 which is actuated by movement of the low-reverse shift rail 101 in the transmission. The switch actuates a solenoid-operated valve 102 which provides communication between the air brake reservoir 103 and the inlet fitting 71 to actuate the air cylinder 66. The solenoid actuator valve 102 is of a known type which ports the inlet fitting 71 to atmosphere in a normally-unactuated position and provides the above-mentioned communication in an actuated position. Other arrangements more suitable to existing transmission shift mechanisms may suggest themselves to those skilled in the art and may be employed herein.

In an alternative embodiment, it is desired that the unidirectional clutch be disengaged during high-speed operation when the drive arrangement utilizes a two-speed or a multispeed rear axle. When a two-speed axle is used in such drive arrangements, the front axle ratio must be geared to the lowest rear axle ratio to provide needed traction at low speed. At higher speeds the unidirectional clutch excessively overruns (i.e., an average of 760 rpm in a two-speed rear axle as opposed to 60 rpm in a one-speed rear axle) and objectionable wear patterns occur on the saw-tooth type teeth 42, 57 in a relatively short time. Furthermore, objectionable noise occurs when the clutch excessively overruns at such speeds. To assure positive disengagement of the unidirectional clutch at the higher axle shift ratios, a switch 105 such as a detent is actuated by movement of a known axle shift lever 106. When switch 105 is actuated, a solenoid actuated valve 107 similar to valve 102 communicates air pressure from reservoir 103 to the second air inlet fitting 71' to result in forward movement of the shift lever 64 as noted above. Because solenoid valve 102 is open to atmosphere at this time the piston 74 is movable in a forward direction. Likewise because solenoid valve 107 vents port 71' to atmosphere the piston 74 is movable in a rearward direction when solenoid valve 102 is actuated. Other arrangements more suitable to conventional axle shift mechanisms may suggest themselves to those skilled in the art and may be employed herein.

The invention has been described with reference to a preferred embodiment. Obviously, modifications and alterations will occur to others upon reading and understanding the specification. It is my intention to include all such modifications and alterations insofar as they come within the scope of the present invention.

It is thus the essence of my invention to provide a unique drive arrangement utilizing a unidirectional clutch and associated lockout means for converting a rear wheel drive arrangement automatically into a four wheel drive arrangement.

Having thus defined my invention, I claim:

1. A clutch arrangement for mounting to a bearing cage of a front drive-steer axle employed in a truck-tractor, said clutch arrangement comprising:

an input shaft journalled in said front axle and extending within a housing;

a pinion shaft longitudinally aligned with said input shaft and extending within and journalled in said housing, said pinion shaft having an end face within said housing and a plurality of saw-tooth type teeth annularly disposed thereabout, said pinion shaft further having a plurality of straight teeth disposed about its periphery adjacent said end face;

an annular clutch member slidingly received over that portion of said input shaft within said housing and affixed thereto for common rotation therewith, said clutch member having an end face juxtaposed said end face of said pinion shaft and a plurality of saw-tooth type teeth spaced thereabout, said clutch member further having a plurality of straight teeth disposed about its outer periphery;

a spring at the opposite end face of said clutch member biasing said clutch member into contact with said pinion shaft;

a collar member having a plurality of straight teeth formed about its interior slidingly received over said clutch member and affixed thereto for common rotation therewith, said collar member having an exterior, circular groove formed thereabout;

a bifurcated shift lever received within said groove; and power means within said housing for effecting common movement of said shift lever and said collar member whereby said pinion shaft and said input shaft are locked together for common rotation.

2. The clutch arrangement as set forth in claim 1 wherein said power means includes an air cylinder within said housing, said air cylinder including:

first, second, and third concentric bores within said housing, an air fitting within said housing communicating with said second bore, a piston within said first bore, said piston having a central opening extending therethrough, a threaded rod extending through said piston opening and secured to said bifurcated lever, a spring within said first bore biasing said piston to a position adjacent said second bore, and sealing means to prevent air from escaping through said second bore.

3. The clutch arrangement of claim 2 wherein said air cylinder further includes said threaded rod having shoulders formed thereon, said shoulders abutting opposing faces of said piston and said bifurcated lever, said housing having an access opening at one end, said access opening longitudinally aligned with said first, second, and third bores, and a knockout plug adapted to be received within said opening.

4. The clutch arrangement of claim 3 wherein said power means is actuable to disengage juxtaposed end faces of said clutch member and said pinion shaft, said first bore has a second fitting communicating therewith and a snap ring secured therein at a predetermined distance, and said second bore has the same diameter as said first bore, a second snap ring secured therein at a predetermined distance, and a second spring disposed therein.

5. The clutch arrangement of claim 4 wherein said clutch member has an external, circular groove formed adjacent said opposite end face and a snap ring disposed therein.

6. The clutch arrangement of claim 3 wherein said saw teeth of said drive pinion are equal in number and configuration to said saw teeth of said clutch member, each saw tooth defined by a rise face surface, a crest and valley dwell face surface intersecting said rise face surface and an engaging surface intersecting said crest and valley dwell face surfaces, and said rise surface intersecting said crest dwell surface at an approximate angle of 27° and said engaging surface undercut at an angle of approximately 15° relative said crest dwell surface.

7. A drive arrangement for a truck-tractor comprising:

a transmission with output connected to a rear drive shaft;

a rear drive axle;

first drive pinion means within said rear axle for transmitting transmission output from said rear drive shaft to the rear wheels of said tractor for driving said tractor;

output drive means within said rear axle rotated by and at a lower speed than said first pinion means, said output means rotating a front drive shaft;

a front, drive-steer axle;

a housing affixed to the input end of said front axle, said housing having a portion of an input shaft for driving said front axle extending therein and a portion of a drive pinion extending therein, said pinion driven by said front drive shaft;

unidirectional overrunning clutch means between said input shaft and said pinion for rotating said input shaft for forward drive of said front axle when said pinion shaft rotates at a speed at least equal to the rotation of said input shaft; and lockout means between said pinion shaft and said input shaft for automatically securing said input shaft and said third pinion together for common rotation when said transmission is shifted into reverse.

8. The drive arrangement of claim 7 wherein said rear driving axle is of the multispeed type, and said lockout means further includes means for disengaging said unidirectional clutch means when said multispeed transmission is shifted from its lowest speed ratio to a higher speed ratio.

9. The drive arrangement of claim 8 wherein said input shaft is journalled within a tapered roller bearing arrangement positioned within the bearing cage of said front axle, said input shaft having a splined portion and a threaded end within said housing;

a splined annular spacer having a plurality of external straight teeth received by said splined portion of said input shaft and a nut in threaded engagement with said threaded end positions said spacer into contact with the cup of said bearing arrangement; and said housing being bolted to said bearing cage by a plurality of fasteners.

* * * * *

UNITED STATES PATENT OFFICE
CERTIFICATE OF CORRECTION

Patent No. 3,827,520    Dated August 6, 1974

Inventor(s) James F. Mueller

It is certified that error appears in the above-identified patent and that said Letters Patent are hereby corrected as shown below:

Column 4, line 65, "42,57b" should read -- 42b,57b --.

Signed and sealed this 5th day of November 1974.

(SEAL)
Attest:

McCOY M. GIBSON JR.
Attesting Officer

C. MARSHALL DANN
Commissioner of Patents